United States Patent [19]

Adams

[11] Patent Number: 4,666,179

[45] Date of Patent: May 19, 1987

[54] TANK CART

[76] Inventor: John F. Adams, 65 Lanark Rd., Apt. #9, Brighton, Mass. 02135

[21] Appl. No.: 660,471

[22] Filed: Oct. 12, 1984

[51] Int. Cl.⁴ .............................................. B62B 1/26
[52] U.S. Cl. ................................. 280/655; 280/47.24; 280/47.28
[58] Field of Search ............... 280/652, 654, 655, 659, 280/47.27, 47.26, 47.28, 47.29, 47.33, 47.25, 47.24; D34/24, 26

[56] References Cited

U.S. PATENT DOCUMENTS

| D. 110,110 | 6/1938 | Eagleson | 280/47.27 |
|---|---|---|---|
| 394,443 | 12/1888 | Berger | 280/47.27 |
| 800,445 | 9/1905 | Hourhihan | 280/47.24 |
| 1,432,037 | 10/1922 | Russell | 280/47.27 |
| 2,770,494 | 11/1956 | Nelson | D34/26 |
| 3,064,990 | 11/1962 | Salvucci | 280/47.27 |
| 3,704,025 | 11/1972 | Cerveny et al. | 280/47.26 |
| 4,040,642 | 8/1977 | David | 280/654 |
| 4,253,716 | 3/1981 | Turner | 280/47.26 |
| 4,284,287 | 8/1981 | Esposito | 280/655 |

FOREIGN PATENT DOCUMENTS

| 1194258 | 11/1959 | France | 280/47.24 |
|---|---|---|---|
| 206873 | 8/1939 | Switzerland | 280/47.24 |
| 694515 | 7/1953 | United Kingdom | 280/47.24 |
| 765552 | 1/1957 | United Kingdom | 280/47.24 |
| 2037672 | 7/1980 | United Kingdom | 280/47.28 |

Primary Examiner—David M. Mitchell
Attorney, Agent, or Firm—Joseph S. Iandiorio; Douglas E. Denninger

[57] ABSTRACT

A cart including a pair of wheels spaced apart and rotatably mounted on an axle; a double-pole carriage including two spaced poles mounted to and extending upwardly from the axle; a handle mounted proximate the top of the carriage; a stand interconnected with the carriage proximate the axle; and a support riser extending outwardly from the axle generally transverse to the carriage and connected at its distal end to the stand.

11 Claims, 5 Drawing Figures

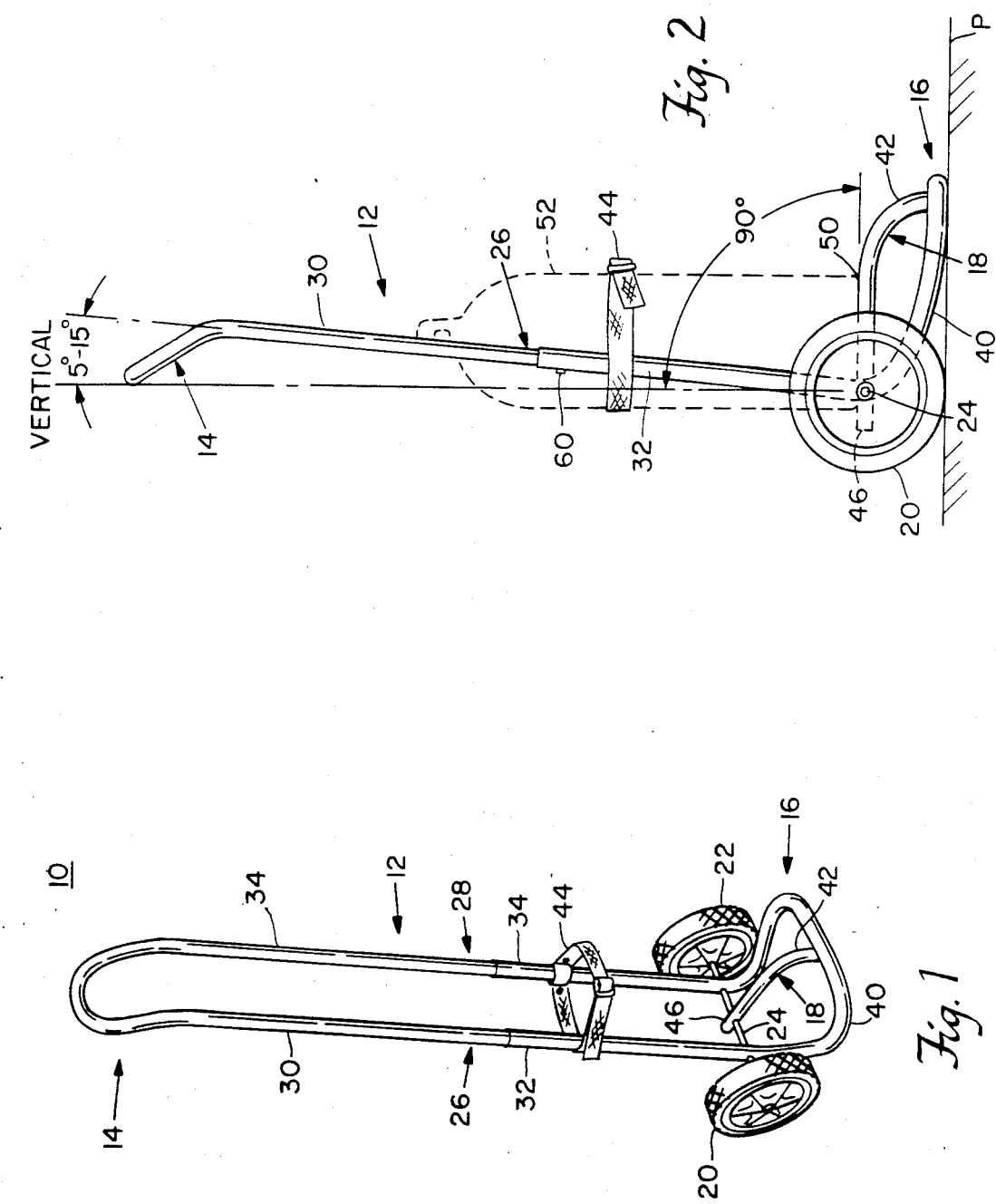

TANK CART

FIELD OF INVENTION

This invention relates to a cart, and more particularly to a cart for carrying tanks and other containers.

BACKGROUND OF INVENTION

Conventional carts used for oxygen tanks and similar containers use a single-pole body of fixed length extending from the axle. The tank or other container rests against the pole with its edge at the axle and its full width extending outward from the axle itself, increasing the bulk of the tank and cart. In addition, with all of the weight of the tank on generally one side of the axle, the effort required to tip the tank is substantial. The relative instability of the one-pole structure requires a strong, typically metal clamp to hold the tank. The pole is generally attached to the center of the axle midway between the wheels, where maximum bending can occur. The stand portion usually employs a pair of fingers which arch over to touch the ground in front of the wheels. Often, on rough or uneven surfaces one of the fingers may rest in a hole and unbalance the cart.

SUMMARY OF INVENTION

It is therefore an object of this invention to provide an improved tank cart which uses a double-pole construction to cradle a tank It is a further object of this invention to provide such an improved cart which carries a tank at least partially over the axle.

It is a further object of this invention to provide such an improved cart which is less bulky and easier to tilt.

It is a further object of this invention to provide such an improved cart which inherently cradles a tank and reduces the need for clamps.

It is a further object of this invention to provide such an improved cart which more uniformly distributes the weight across the axle.

It is a further object of this invention to provide such an improved cart which distributes the weight closer to the supporting cart wheels.

It is a further object of this invention to provide such an improved cart in which the stand portion is broader and more secure.

It is a further object of this invention to provide such an improved cart which can be easily adapted to contain smaller containers such as liquid tanks.

The invention features a cart including a pair of wheels spaced apart and rotatably mounted on an axle. There is a double-pole carriage including two spaced poles mounted to and extending upwardly from the axle. A handle is mounted proximate the top of the carriage and a stand is interconnected with the carriage proximate the axle. A support riser extends outwardly from the axle, generally transverse to the carriage and connected at its distal end to the stand.

In a preferred embodiment the poles of the carriage are each formed of a pair of tubes, one telescopically received in the other. The carriage may also include means for locking the telescoping tubes in at least one extended position. The carriage may be canted slightly forward, with the stand and wheels resting on the same plane. The cant may be in the range of 5°–15° of forward lean. The upper tube of each pair may be connected to a "U"-shaped handle and the tubes may be integrally formed with the "U"-shaped handle. The stand may include a tubular member extending from the axle proximate each pole outwardly to the distal end of the riser. The tubular member may be "C"-shaped and it may include first and second segments extending outwardly from the axle and a third, narrower segment received in the distal end of each of the first and second segments and interconnected with the riser.

The riser may be perpendicular to the carriage, and the carriage may include strapping means for holding an object to the carriage. There may also be a cage fastened to the carriage above the riser for holding a variety of shapes of objects. The riser may extend across the axle.

DISCLOSURE OF PREFERRED EMBODIMENT

Other objects, features and advantages will occur from the following description of a preferred embodiment and the accompanying drawings, in which:

FIG. 1 is an axonometric view of a cart according to this invention;

FIG. 2 is a side elevational view of the cart of FIG. 1 carrying an oxygen tank, shown in phantom;

Figure 3:
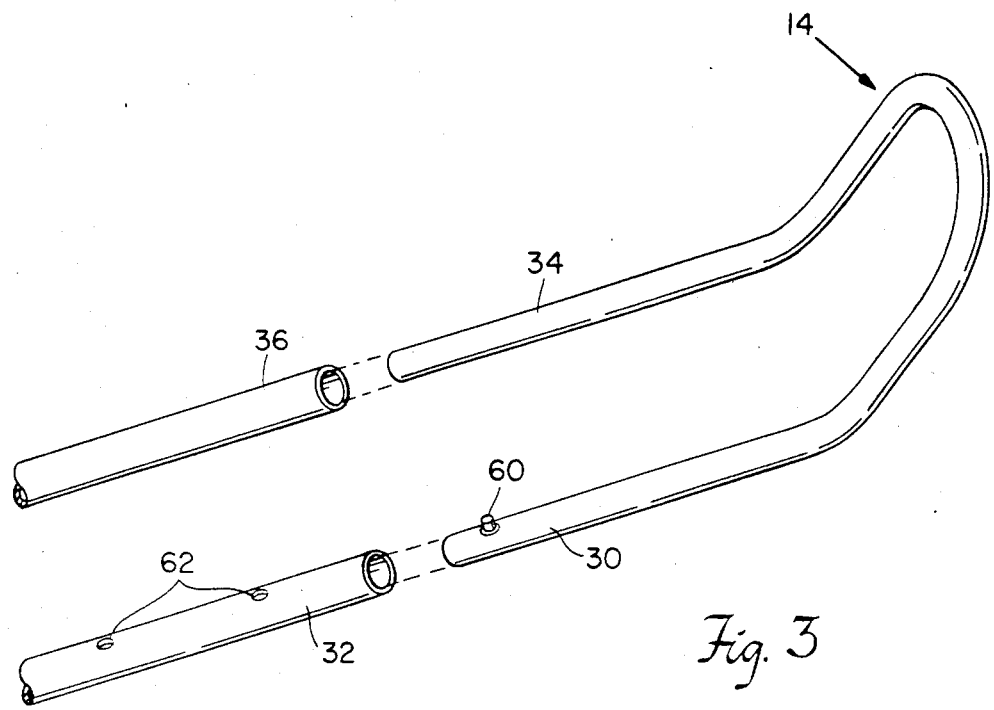
FIG. 3 is an enlarged exploded view of the carriage showing the telescoping and locking action.

The invention may be accomplished in a cart such as for carrying oxygen tanks, disinfectant and paint spray tanks, fire extinguishers, liquid gas tanks, and other containers and cargo. The cart includes a pair of wheels spaced apart and rotatably mounted on an axle. There is a double-pole carriage which includes two spaced poles mounted to and extending upwardly from the axle. The poles are typically parallel and generally vertical, with a slight forward lean to prevent the stand from too easily being accidentally tipped when it is in its rest position. There is a handle mounted proximate the top of the carriage which may be integrally formed with the poles that form the carriage. There is a stand at the lower part of the cart interconnected with the carriage proximate the axle, and a support riser extends outwardly from the axle, generally transverse to the carriage and connected at its distal end to the stand.

Typically each of the poles of the carriage is formed of a pair of tubes, one of which is telescopically received in the other. The two upper tubes are generally the narrow ones, which slide into the wider lower tubes. A locking means which is a spring detent on one or both of the upper tubes mates with one or more holes on the lower tubes so that the upper two tubes and handle can be extended or collapsed to accommodate varying heights of the user and/or the tank or cargo being carried. Desirable dimensions for cradling D and E size cylinders, such as cylinders of oxygen, include a spacing between the lower pair of poles of about 3.5 inches. At one preferred extended height the handle will rest approximately 42 inches above the center of the axle. The lower two tubes may be formed from a single tube bent in a generally "C"-shaped loop at the bottom to form the stand. The term "C"-shaped is intended to include a "U"-shaped or other similarly shaped loop. The forward cant of the carriage is typically in the range of 5°–15°. The tubular member which forms a part of the stand may actually be formed of three separate segments: the first and second segments, which extend from and may be integrally formed with the lower portions of the poles of the carriage, and a third, narrower segment which is secured in the open end of each of the poles and interconnected near the center of the third segment with the riser at its distal or free end. The riser is generally perpendicular to the carriage so that an oxygen tank or similar object nests easily in the cradle formed by the two spaced poles of the carriage. A strap is usually provided to secure the tank about its middle or upper portion to the carriage. A rectangular cage may also be used which mounts on the lower portion of the carriage poles above the riser to accommodate a variety of shapes of tanks. The riser typically extends a little bit beyond the axle to give support to the slightly overhanging tank. The cradled position of the tank between the poles brings the tank inward so that it extends a little more over the axle, as opposed to prior art devices. This improves the weight distribution for ease of tilting and control and it also makes the overall depth of the loaded cart somewhat less. In addition, the carriage construction, which uses two poles spaced apart on the axle, provides a better overall weight distribution of the load on the axle and places more of the loading at the outer ends of the axle near the wheels, where the axle has greater support. The stand formed of the tubular member is broader and provides a more secure and stable cart.

There is shown in FIG. 1 a cart 10 according to this invention including a double-pole carriage 12, a handle 14, a stand 16, and a riser 18. There is a pair of wheels 20, 22 spaced from each other and rotatably mounted on an axle 24. Carriage 12 includes a pair of upright poles 26, 28, which may be single unitary elements or may be each composed of a pair of tubes 30, 32 and 34, 36. In FIG. 1, tubes 30 and 34 are slightly narrower than tubes 32 and 36 so that they may be telescopically slid and received in the larger tubes 32 and 36. Handle 14 in the embodiment of FIG. 1 is shown as integrally formed with tubes 30 and 34: in fact, tube 30, handle 14 and tube 34 are one continuous piece bent in a generally "U"-shaped configuration. Similarly, tubes 32 and 36 may be formed of one continuous piece integral with a tubular member 40 that forms stand 16. Stand 16 may be formed of a single tubular member 40 which extends outwardly from axle 24 at the lower end of tubes 32 and 36 and meets with the distal end 42 of riser 18. A strap 44 of conventional design may be attached to poles 26 and 28 for snugly securing the tank or other object to carriage 12. Distal end 42 is connected to tube 40 of stand 16. The other end 46 of riser 18 extends slightly beyond axle 24.

Carriage 12 is canted slightly forward by an angle of 5°–15° from the vertical, FIG. 2. When the wheels 20, 22 and stand 16 are supported on the same plane P, the top surface 50 of riser 18 is generally perpendicular, that is 90°, to poles 26 and 28 of carriage 12. This permits an object such as oxygen tank 52, shown in phantom, to rest on surface 50 and be gently nested in the cradle space formed between poles 26 and 28 so that a portion of the tank extends slightly beyond axle 24 and is supported by the end 46 of riser 18 which extends beyond axle 24. Conventional strap 44 provides further security and preferably includes a quick-release mechanism (not shown) for easier mounting and dismounting of tank 52. A spring-loaded detent button 60, shown more clearly in FIG. 3, may be provided in either of tubes 30 or 34, or both, so that it mates with one or more holes 62 in the mating tube and allows the carriage to be adjustable in height to accommodate variations in either the height of the user or of the cargo. Preferably, tubes 30 and 34 may be slid downward when the cart is not in use. In other words, button 60 may be depressed and passed downward beyond holes 62 as tubes 30 and 34 descend toward the axle. The cart will thereby occupy less space when not in use.

Figure 4:
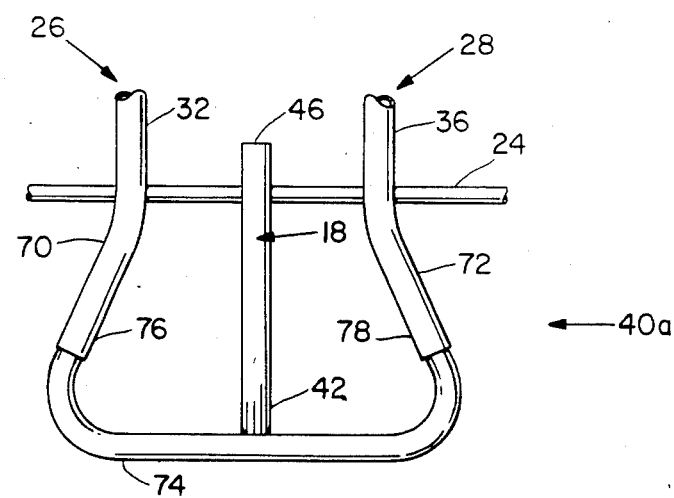
FIG. 4 is a top plan view of the lower part of the cart showing an alternative construction for the stand.

Stand 16 may be a solid plate as used in conventional hand trucks, but is more preferably made of a generally "U"-shaped or "C"-shaped member 40, as indicated in FIGS. 1 and 2. Member 40 need not, however, be a single piece, nor need it be integrally typically formed with tubes 32 and 36. For example, member 40a, FIG. 4, may include two segments 70, 72 which extend from axle 24 outwardly. Segments 70 and 72 may be formed integrally or separately with respect to poles 26 and 28. A third member 74, typically formed of narrower tubing, may be telescopically received in the ends 76, 78 of segments 70 and 72.

Figure 5:
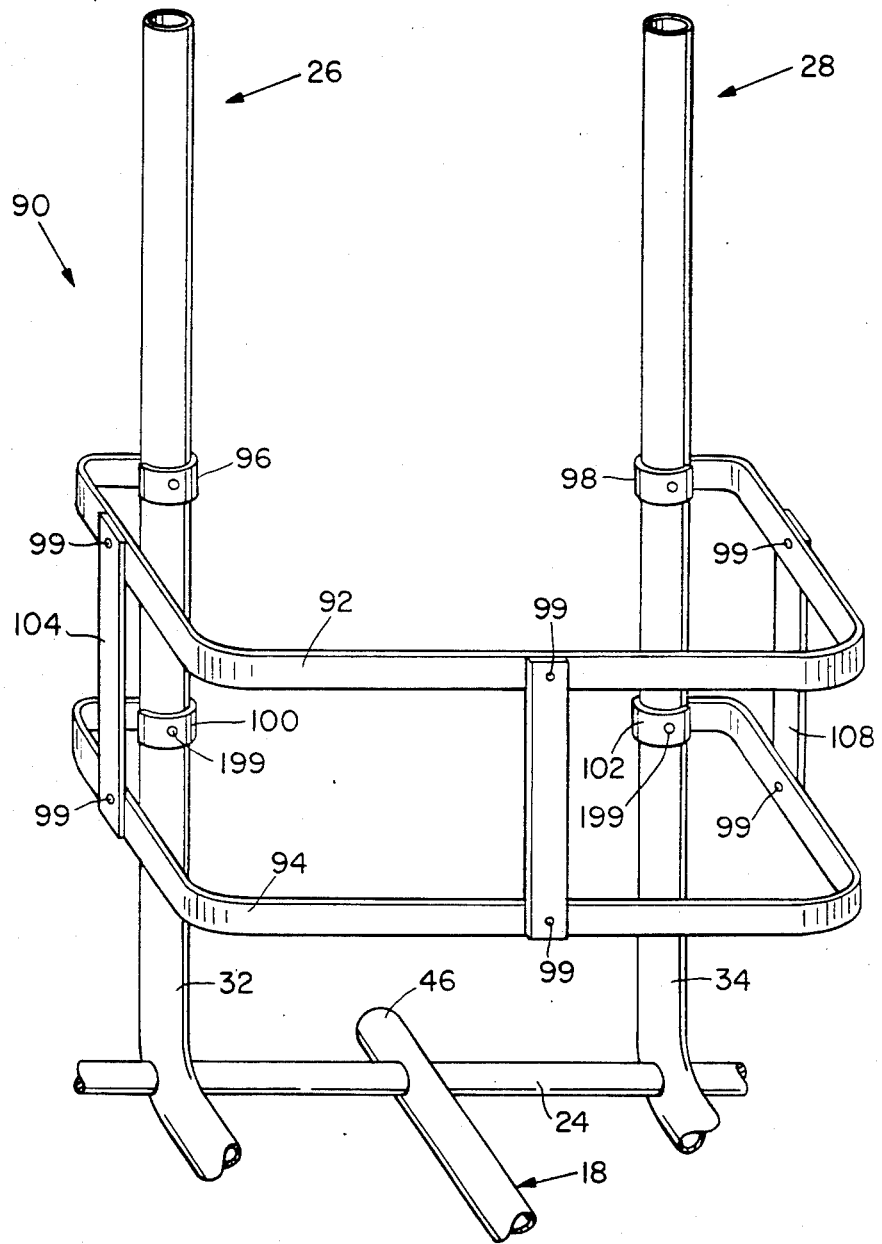
FIG. 5 is an axonometric view of a portion of the carriage showing a special cage to accommodate a variety of tanks and containers.

An additional cage 90, FIG. 5, may be provided for holding other objects or containers of various sizes which may rest on riser 18. Cage 90 includes two spaced horizontal straps 92 and 94, generally rectangular in form and wrapped at each end 96 and 98 about tubes 32 and 34, respectively. A lower strap 94 also has its ends 100, 102 wrapped around tubes 32 and 34. These ends 100 and 102 are riveted to tubes 32 and 34 by rivets 199. A number of vertical straps 104, 106, 108, are fastened by rivets 99 to complete the structure. Rivets 199 may be omitted from cage 90 if the containers to be carried are sufficiently short in height relative to cage 90.

Other embodiments will occur to those skilled in the art and are within the following claims:

What is claimed is:

1. A cart for carrying a tank, comprising:
    a pair of wheels spaced apart and rotatably mounted on an axle;
    a double-pole carriage including two spaced poles mounted to and extending upwardly from said axle, said poles spaced to cradle the tank with a portion of the tank extendable rearwardly over said axle;
    a handle mounted proximate the top of said carriage;
    a stand interconnected with said carriage proximate said axle;
    a support riser extending outwardly from said axle generally transverse to said carriage and connected at its distal end to said stand, said riser aligned to support the bottom of the tank partially over said axle; and
    said stand including a tubular member extending from the axle proximate each pole outwardly to the distal end of said riser, said tubular member including first and second segments extending outwardly from said axle and a third, narrower segment received in the distal end of each of the first and second segments and interconnected with said riser.

2. The cart of claim 1 in which said poles of said carriage are each formed of a pair tubes, one telescopically received in the other.

3. The cart of claim 2 in which said carriage includes means for locking said telescoping tubes in at least one extended position.

4. The cart of claim 1 in which said carriage is canted slightly forward with the stand and wheels resting on the same plane.

5. The cart of claim 1 in which at least the upper surface of said riser is perpendicular to said carriage.

6. The cart of claim 2 in which the upper tube of each pair is connected to a "U"-shaped handle.

7. The cart of claim 6 in which said upper tubes are integrally formed with said "U"-shaped handle.

8. The cart of claim 1 in which said carriage includes strapping means for holding an object to said carriage.

9. The cart of claim 1 in which said tubular member is "C"-shaped.

10. The cart of claim 1 further including a cage fastened to said carriage above said riser.

11. The cart of claim 1 in which the proximal end of said riser extends across said axle and projects rearwardly beyond said axle at least as far as the tank is extendable over said axle.

* * * * *